(12) United States Patent
Stierman et al.

(10) Patent No.: US 7,831,042 B2
(45) Date of Patent: Nov. 9, 2010

(54) THREE-DIMENSIONAL AUTHENTICATION OF MICROPARTICLE MARK

(75) Inventors: Thomas Stierman, Mahtomedi, MN (US); Dan Hunt, Mounds View, MN (US); Chris Zdon, Minneapolis, MN (US)

(73) Assignee: SMI Holdings, Inc., Arden Hills, MN (US)

( * ) Notice: Subject to any disclaimer, the term of this patent is extended or adjusted under 35 U.S.C. 154(b) by 0 days.

(21) Appl. No.: 11/685,759

(22) Filed: Mar. 13, 2007

(65) Prior Publication Data

US 2008/0034426 A1 Feb. 7, 2008

Related U.S. Application Data

(60) Provisional application No. 60/781,626, filed on Mar. 13, 2006, provisional application No. 60/781,955, filed on Mar. 13, 2006, provisional application No. 60/781,930, filed on Mar. 13, 2006.

(51) Int. Cl.
  *G06F 11/30* (2006.01)
(52) U.S. Cl. ............................ 380/54; 726/22; 380/209; 380/217; 713/176; 713/179; 713/185; 713/193; 235/380; 283/113
(58) Field of Classification Search ................... 726/22; 380/54, 209, 217; 713/176, 179, 185, 186, 713/193; 709/204; 382/100; 235/380, 462.01; 283/113
See application file for complete search history.

(56) References Cited

U.S. PATENT DOCUMENTS

| | | | |
|---|---|---|---|
| 1,787,995 A | 1/1931 | Reilly | |
| 2,058,774 A | 10/1936 | Colligan | |
| 2,088,412 A | 7/1937 | Grosvenor | |
| 2,265,196 A | 12/1941 | Riley | |
| 2,687,367 A | 8/1954 | Burrin | |
| 2,885,366 A | 5/1959 | Iler | |

(Continued)

FOREIGN PATENT DOCUMENTS

CA    1056653    6/1979

(Continued)

OTHER PUBLICATIONS

Intrinsic Signature Identification System (ISIS), Verification Technologies, Inc., http://www.netventure.com/vti/isis/main.htm, Aug. 26, 1999, 2 pages.

(Continued)

*Primary Examiner*—Benjamin E Lanier
*Assistant Examiner*—Hadi Armouche
(74) *Attorney, Agent, or Firm*—Patterson Thuente Christensen Pedersen P.A.

(57) ABSTRACT

A system, method, and apparatus for authenticating microparticle marks or marks including other three-dimensional objects. The authentication utilizes two or more sets of information captured or acquired for the mark in response to illumination of the mark by electromagnetic energy such as in the visible frequency range. These sets of information are then used to verify that the mark includes three-dimensional objects such as microparticles. The two or more sets of information about the mark preferably vary from each other in time, space/directionality, color, frequency or any combinations thereof, and can be captured or acquired as part of one, two, or more images of the microparticle mark.

17 Claims, 8 Drawing Sheets

U.S. PATENT DOCUMENTS

| | | |
|---|---|---|
| 2,963,378 A | 12/1960 | Palmquist et al. |
| 3,013,958 A | 12/1961 | Fearon |
| 3,113,991 A | 12/1963 | Kleber |
| 3,128,744 A | 4/1964 | Jefferts |
| 3,366,573 A | 1/1968 | Feuer |
| 3,451,778 A | 6/1969 | Fearon |
| 3,567,909 A | 3/1971 | Allen |
| 3,574,550 A | 4/1971 | Scott et al. |
| 3,628,271 A | 12/1971 | Carrell |
| 3,632,993 A | 1/1972 | Acker |
| 3,663,685 A | 5/1972 | Evans |
| 3,663,801 A | 5/1972 | Wahli et al. |
| 3,700,305 A | 10/1972 | Bingham |
| 3,704,952 A | 12/1972 | Bird |
| 3,733,178 A | 5/1973 | Eriksen |
| 3,736,500 A | 5/1973 | Berkowitz et al. |
| 3,772,099 A | 11/1973 | Ryan et al. |
| 3,772,200 A | 11/1973 | Livesay |
| 3,788,814 A | 1/1974 | Goldblatt et al. |
| 3,835,297 A | 9/1974 | Inoue et al. |
| 3,835,782 A | 9/1974 | Griffith et al. |
| 3,861,886 A | 1/1975 | Meloy |
| 3,897,284 A | 7/1975 | Livesay |
| 3,950,891 A | 4/1976 | Hinkes |
| 3,958,041 A | 5/1976 | Wagner et al. |
| 3,964,294 A | 6/1976 | Shair et al. |
| 3,967,990 A | 7/1976 | Ryan et al. |
| 3,985,602 A | 10/1976 | Stuart |
| 4,013,490 A | 3/1977 | Ryan et al. |
| 4,018,635 A | 4/1977 | Ryan et al. |
| 4,023,040 A | 5/1977 | Weber |
| 4,029,506 A | 6/1977 | Dessauer |
| RE29,334 E | 8/1977 | Lauf |
| 4,053,433 A | 10/1977 | Lee |
| 4,097,279 A | 6/1978 | Whitehead |
| 4,131,064 A | 12/1978 | Ryan et al. |
| 4,197,104 A | 4/1980 | Krystyniak et al. |
| 4,198,307 A | 4/1980 | Berkowitz et al. |
| 4,223,004 A | 9/1980 | Hsia et al. |
| 4,238,524 A | 12/1980 | LaLiberte et al. |
| 4,243,734 A | 1/1981 | Dillon |
| 4,251,726 A | 2/1981 | Alvarez |
| 4,321,056 A | 3/1982 | Dimitroff |
| 4,329,393 A | 5/1982 | LaPerre et al. |
| 4,359,353 A | 11/1982 | Kydd |
| 4,359,399 A | 11/1982 | Boyars |
| 4,390,452 A | 6/1983 | Stevens |
| 4,397,142 A | 8/1983 | Bingham |
| 4,399,226 A | 8/1983 | Danielson et al. |
| 4,431,766 A | 2/1984 | Christie et al. |
| 4,441,943 A | 4/1984 | Kydd |
| 4,469,623 A | 9/1984 | Danielson et al. |
| 4,520,109 A | 5/1985 | Simmonds et al. |
| 4,606,927 A | 8/1986 | Jones |
| 4,640,035 A | 2/1987 | Kind et al. |
| 4,652,395 A | 3/1987 | Marcina |
| 4,654,165 A | 3/1987 | Eisenberg |
| 4,690,689 A | 9/1987 | Malcosky et al. |
| 4,715,988 A | 12/1987 | Colin |
| 4,731,531 A | 3/1988 | Handke |
| 4,744,919 A | 5/1988 | O'Holleran |
| 4,764,474 A | 8/1988 | Orelup |
| 4,771,005 A | 9/1988 | Spiro |
| 4,785,290 A | 11/1988 | Goldman |
| 4,812,171 A | 3/1989 | Brettle |
| 4,812,412 A | 3/1989 | Turner |
| 4,824,144 A | 4/1989 | Tasma |
| 4,862,143 A | 8/1989 | Hirshfield et al. |
| 4,939,372 A | 7/1990 | Schvoerer et al. |
| 5,023,923 A | 6/1991 | Sanner et al. |
| 5,035,920 A | 7/1991 | Smrt et al. |
| 5,057,268 A | 10/1991 | Muller |
| 5,111,882 A | 5/1992 | Tang et al. |
| 5,118,369 A | 6/1992 | Shamir |
| 5,129,974 A | 7/1992 | Aurenius |
| 5,169,558 A | 12/1992 | Smrt et al. |
| 5,179,027 A | 1/1993 | Fisher |
| 5,217,708 A | 6/1993 | Pinkney |
| 5,246,861 A | 9/1993 | Miller et al. |
| 5,256,572 A | 10/1993 | Tang et al. |
| 5,267,756 A | 12/1993 | Molee et al. |
| 5,268,899 A | 12/1993 | Brown |
| 5,272,216 A | 12/1993 | Clark, Jr. et al. |
| 5,294,476 A | 3/1994 | Calhoun |
| 5,310,222 A | 5/1994 | Chatwin et al. |
| 5,380,047 A | 1/1995 | Molee et al. |
| 5,391,595 A | 2/1995 | Clark, Jr. et al. |
| 5,411,799 A | 5/1995 | Loving |
| 5,426,289 A | 6/1995 | Kinoshita et al. |
| 5,435,249 A | 7/1995 | Brent |
| 5,450,190 A | 9/1995 | Schwartz et al. |
| 5,454,324 A | 10/1995 | Larmignat |
| 5,474,937 A | 12/1995 | Anderson, II et al. |
| 5,521,984 A | 5/1996 | Denenberg et al. |
| 5,568,555 A | 10/1996 | Shamir |
| 5,619,025 A | 4/1997 | Hickman et al. |
| 5,637,169 A | 6/1997 | Hull et al. |
| 5,659,631 A | 8/1997 | Gormish et al. |
| 5,673,338 A | 9/1997 | Denenberg et al. |
| 5,677,187 A | 10/1997 | Anderson, II et al. |
| 5,760,394 A | 6/1998 | Welle |
| 5,763,176 A | 6/1998 | Slater et al. |
| 5,789,183 A | 8/1998 | Lee et al. |
| 5,798,147 A | 8/1998 | Beck |
| 5,818,032 A | 10/1998 | Sun et al. |
| 5,830,542 A | 11/1998 | Shigeno |
| 5,837,042 A | 11/1998 | Lent |
| 5,869,828 A | 2/1999 | Braginsky |
| 5,873,604 A | 2/1999 | Phillips |
| 5,888,444 A | 3/1999 | Dannenhauer et al. |
| 5,962,082 A | 10/1999 | Hendrickson et al. |
| 5,974,150 A | 10/1999 | Kaish et al. |
| 5,974,974 A | 11/1999 | Agnew |
| 6,019,287 A | 2/2000 | Mann |
| 6,025,200 A | 2/2000 | Kaish et al. |
| 6,030,000 A | 2/2000 | Diamond |
| 6,108,612 A | 8/2000 | Vescovi et al. |
| 6,147,149 A | 11/2000 | Anderson et al. |
| 6,165,609 A | 12/2000 | Curatolo |
| 6,200,628 B1 | 3/2001 | Rozumek et al. |
| 6,203,736 B1 | 3/2001 | Gailberger et al. |
| 6,232,124 B1 | 5/2001 | Selinfreund |
| 6,309,690 B1 | 10/2001 | Brogger et al. |
| 6,406,725 B1 | 6/2002 | Taylor |
| 6,432,715 B1 | 8/2002 | Nelson et al. |
| 6,455,157 B1 | 9/2002 | Simons |
| 6,458,595 B1 | 10/2002 | Selinfreund |
| 6,477,227 B1 | 11/2002 | Kaiser et al. |
| 6,490,030 B1 | 12/2002 | Gill et al. |
| 6,501,825 B2 | 12/2002 | Kaiser et al. |
| 6,512,580 B1 | 1/2003 | Behringer et al. |
| 6,524,859 B1 | 2/2003 | Heese |
| 6,525,111 B1 | 2/2003 | Spencer et al. |
| 6,572,784 B1 | 6/2003 | Coombs |
| 6,589,626 B2 | 7/2003 | Selinfreund et al. |
| 6,609,728 B1 | 8/2003 | Voerman et al. |
| 6,611,612 B2 | 8/2003 | Mann |
| 6,620,360 B1 | 9/2003 | Simons |
| 6,630,960 B2 | 10/2003 | Takahashi et al. |
| 6,638,593 B2 | 10/2003 | Selinfreund et al. |
| 6,647,649 B2 | 11/2003 | Hunt et al. |
| 6,659,507 B2 * | 12/2003 | Banahan ............... 283/81 |
| 6,691,916 B2 | 2/2004 | Noyes |
| 6,692,031 B2 | 2/2004 | McGrew |

| | | | |
|---|---|---|---|
| 6,701,304 B2 * | 3/2004 | Leon | 705/401 |
| 6,707,539 B2 | 3/2004 | Selinfreund et al. | |
| 6,708,618 B1 | 3/2004 | Tsai | |
| 6,721,440 B2 * | 4/2004 | Reed et al. | 382/100 |
| 7,288,320 B2 | 4/2004 | Steenblik et al. | |
| 6,735,324 B1 | 5/2004 | McKinley et al. | |
| 6,989,525 B2 | 11/2004 | Howard | |
| 6,850,592 B2 * | 2/2005 | Schramm et al. | 378/45 |
| 6,899,827 B2 | 5/2005 | Lauf et al. | |
| 6,908,737 B2 | 6/2005 | Ravkin et al. | |
| 6,909,770 B2 | 6/2005 | Schramm et al. | |
| 6,948,068 B2 * | 9/2005 | Lawandy et al. | 713/176 |
| 7,038,766 B2 | 5/2006 | Kerns et al. | |
| 7,039,214 B2 * | 5/2006 | Miller et al. | 382/100 |
| 7,046,828 B1 | 5/2006 | Gibbs | |
| 7,055,691 B2 | 6/2006 | Safian | |
| 7,389,420 B2 * | 6/2008 | Tian | 713/176 |
| 2001/0041214 A1 | 11/2001 | Brogger et al. | |
| 2001/0049101 A1 | 12/2001 | Brogger et al. | |
| 2002/0009208 A1 * | 1/2002 | Alattar et al. | 382/100 |
| 2002/0023218 A1 * | 2/2002 | Lawandy et al. | 713/176 |
| 2002/0129523 A1 * | 9/2002 | Hunt | 40/594 |
| 2003/0032033 A1 * | 2/2003 | Anglin et al. | 435/6 |
| 2003/0036201 A1 | 2/2003 | Nelson et al. | |
| 2003/0058990 A1 | 3/2003 | Kaiser et al. | |
| 2003/0194052 A1 | 10/2003 | Price | |
| 2003/0194053 A1 | 10/2003 | Schramm | |
| 2003/0211288 A1 | 11/2003 | Schottland | |
| 2004/0004829 A1 | 1/2004 | Policappelli | |
| 2004/0022444 A1 * | 2/2004 | Rhoads | 382/232 |
| 2004/0029295 A1 | 2/2004 | Brogger et al. | |
| 2004/0098891 A1 * | 5/2004 | Hunt et al. | 40/326 |
| 2005/0031838 A1 | 2/2005 | Lagunowich et al. | |
| 2005/0094848 A1 * | 5/2005 | Carr et al. | 382/100 |
| 2005/0135656 A1 * | 6/2005 | Alattar et al. | 382/100 |
| 2005/0150964 A1 * | 7/2005 | Lo | 235/494 |
| 2005/0181511 A1 | 8/2005 | Mun et al. | |
| 2005/0230962 A1 | 10/2005 | Berson | |
| 2005/0239207 A1 | 10/2005 | Gelbart | |
| 2005/0255599 A1 * | 11/2005 | Wang et al. | 436/56 |
| 2005/0264001 A1 | 12/2005 | Kerns et al. | |
| 2005/0276906 A1 | 12/2005 | Metzger | |
| 2005/0289061 A1 * | 12/2005 | Kulakowski et al. | 705/50 |
| 2006/0014045 A1 | 1/2006 | Einhorn et al. | |
| 2006/0037222 A1 * | 2/2006 | Hunt et al. | 40/326 |
| 2006/0048248 A1 | 3/2006 | Deppermann | |
| 2006/0091670 A1 | 5/2006 | Gaynor | |
| 2006/0244253 A1 | 11/2006 | Wei | |
| 2007/0063051 A1 | 3/2007 | László et al. | |
| 2007/0254138 A1 | 11/2007 | Remmer | |
| 2008/0034426 A1 | 2/2008 | Stierman et al. | |
| 2009/0136079 A1 | 5/2009 | Stierman | |

FOREIGN PATENT DOCUMENTS

| | | |
|---|---|---|
| CA | 2223163 | 10/1997 |
| DE | 1961474 | 7/1970 |
| DE | 2651528 | 5/1977 |
| DE | 2607014 | 3/1985 |
| EP | 0787656 | 5/2003 |
| FR | 2330537 | 7/1981 |
| GB | 1568699 | 6/1980 |
| GB | 2178481 | 2/1987 |
| GB | 2286044 | 8/1995 |
| GB | 2319337 | 5/1998 |
| JP | 52068278 | 6/1977 |
| NL | 9301405 | 3/1995 |
| WO | WO 99/45514 | 9/1999 |
| WO | WO 00/34937 | 6/2000 |
| WO | WO01/37207 | 5/2001 |
| WO | WO 03/048726 A3 | 6/2003 |
| WO | WO03/098188 | 11/2003 |
| WO | WO2004/089640 A2 | 10/2004 |
| WO | WO2005/014928 A2 | 2/2005 |
| WO | WO2005/040001 A1 | 5/2005 |
| WO | WO2005/085087 A1 | 9/2005 |
| WO | WO2005/104008 A1 | 11/2005 |
| WO | WO 2005/119612 | 12/2005 |
| WO | WO2005/123408 A2 | 12/2005 |
| WO | WO 2007/106512 A2 | 9/2007 |
| WO | WO 2007/106514 A2 | 9/2007 |
| WO | WO 2007/106515 A2 | 9/2007 |

OTHER PUBLICATIONS

High Quality Sports Memorabilia, TRACERCODE®, Total Sports Concept, http://www.totalsportsconcepts.com/Authenticity.html, Mar. 15, 1999, 2 pages.

Kaplan, "Maximizing the Benefits of Brand Security—New Developments for Smart Production," PPMS Magazine, Spring 2003 Issue, 3 pages.

Pappu, "Physical One-Way Functions," Science, Sep. 20, 2002, vol. 297, Issue 5589, 9 pages.

PCT International Search Report, PCT/US07/06387, 2 pages.

PCT International Search Report, WO 2003/048726 A3, 2 pages.

PCT International Search Report, PCT/US07/06388, 4 pages.

PCT International Search Report, PCT/US07/06378, 3 pages.

"Tagging makes RFID labels secure, says Creo." http://www.in-pharmatechnologist.com/Packaging/Tagging-makes-RFID-labels-secure-says-Creo. May 20, 2005, 1 page.

"Kodak Traceless System for Pharmaceutical Anticounterfeiting". pp. 1, http://graphics1.kodak.com/jp/product/security_authentication/traceless_pharmaceutical/default.htm, date unknown.

Creo and Acucote: New Security Label Stocks. pp. 1-2, May 2005.

Kodak Stop Counterfeiting Protect Your high-Liability Pharmaceuticals. pp. 1-28, date unknown.

Harrell, "If You want to Stop Counterfeiting or Track & Trace: Hi-Value Developed Brands-Pharmaceuticals & Cosmetics-Consumer Products." pp. 1-78, date unknown.

U.S. Appl. No. 11/685,760 (not yet published; Examiner has access through PAIR), filed Mar. 13, 2007, Inventor: Thomas Stierman.

U.S. Appl. No. 09/454,441 (now abandoned), filed Dec. 3, 1999, Inventor: Daniel R. Hunt.

Fisher, "Copycat Killer", NewScientist, Apr. 20, 2007. www.newscientist.com, pp. 1-6.

PCT International Preliminary Report on Patentability, PCT/US2007/006388 filed Mar. 13, 2007, 8 pages.

US 6,780,301, 08/2004, Natan (withdrawn)

* cited by examiner

THREE-DIMENSIONAL AUTHENTICATION OF MICROPARTICLE MARK

PRIORITY CLAIM

The present application claims the benefit of U.S. Provisional Application No. 60/781,626, filed Mar. 13, 2006, entitled "Three-Dimensional Authentication of Microparticle Mark," U.S. Provisional Application No. 60/781,955, filed Mar. 13, 2006, entitled "Unique Codes for Microparticle Marks Based on Signature Strings," and U.S. Provisional Application No. 60/781,930, filed Mar. 13, 2006, entitled "Automatic Microparticle Mark Reader," which are incorporated herein in their entirety by reference.

FIELD OF THE INVENTION

The present invention generally relates to articles having concealed or covert, yet revealable, information using a mark incorporating a multiplicity of three-dimensional objects such as microparticles. More particularly, the present invention relates to systems, apparatuses, and methods for authenticating marks on or in articles, article packaging, or article labeling, whereby the marks are verified to have authentic, three-dimensional objects such as microparticles.

BACKGROUND OF THE INVENTION

Counterfeiting, tampering, and product diversion account for nearly a half-trillion dollars in worldwide business losses every year. While these business losses are staggering, public trust is also declining as a result of these problems. News stories documenting problems such as black market fraud, theft, gray market goods, and product tampering contribute to the dwindling public trust in the authenticity of goods and services.

Marks incorporating a multiplicity of microparticles ("microparticle marks") have been used in the past to combat counterfeiting, tampering, and product diversion. Microparticles have been used for identifying and authenticating many types of materials and objects, including the use of microparticles directly in bulk materials (e.g., fertilizer, chemicals, paints, oils, plastics, pigments, clays, fertilizers, and explosives), the use of marks incorporating a multiplicity of microparticles, on or in containers for prepackaged materials (e.g., shampoo, conditioner, lotion, motor oils, and pharmaceuticals), and the use of marks incorporating a multiplicity of microparticles on individual product units (e.g. stereos, cameras, computers, videocassette recorders (VCRs), furniture, motorized vehicles, and livestock).

Since the late 1970's, multi-layered color-coded microparticles specifically have been used to covertly mark materials and objects. U.S. Pat. Nos. 4,053,433 and 4,390,452 and GB Patent No. 1,568,699 describe multi-layered color coded particles for marking articles. Specifically, U.S. Pat. No. 4,053,433 describes a method of marking a substance with microparticles encoded with an orderly sequence of visually distinguishable colored segments detectable with a microscope or other magnifying device. GB Patent No. 1,568,699 describes systems for making microparticles of layered colored material, which have generally parallel flat surfaces with irregular broken edges there between, enabling visualization of the code.

Other examples of multi-layered color-coded microparticles are described in U.S. Pat. Nos. 6,647,649 and 6,455,157, wherein each describes methods for generating unique codes from sets of multi-layered color-coded microparticles.

Additional types of microparticles are described in DE Patent No. 19,614,174 and U.S. Pat. No. 4,606,927. DE Patent No. 19,614,174 describes a process for producing multi-layered microparticles by forming a laminate sheet of colored layers and crushing the sheet. The individual marking layers are applied by a printing process, by bronzing, by spray painting, or by roll coating. U.S. Pat. No. 4,606,927 describes microparticles encased in a transparent solid matrix obtained by hardening a liquid adhesive.

While multi-layered color-coded microparticle marks have been useful in tamper and counterfeit detection, verification of articles using such marks has been a manual visual process using a microscope or other magnification system to permit a user to confirm the existence of the expected type of multi-layer color-coded microparticles within an area on an object where the microparticle mark is expected.

Automated reader systems have been developed for single expression microparticles, such as the readers for thermal or laser activated microparticle powders as described, for example, in PCT Publ. No. WO2005/104008A1. These single expression microparticle readers generally rely on both the "invisibility" of the microparticle until the microparticle is activated by the reader and the random location of the microparticles dispersed relative to a registration mark to create a unique code for the security and authentication purposes. Although such automated reader systems for identifying random patterns of single expression microparticles can be useful, the significantly higher level of complexity associated with automatically reading anything other than the presence and/or location of single expression microparticle marks has so far stymied the development of automated readers for multi-layer multi-color microparticle marks.

While the microparticles, including multi-layered color-coded microparticles, can represent a level of security that is generally useful in protecting against counterfeiting, tampering, and product diversion, it can be anticipated that a day will come in which counterfeiters will attempt to create two-dimensional images depicting marks incorporating a multiplicity of microparticles and place the counterfeit images on counterfeit or diverted products. Although a human may distinguish such two-dimensional replica images from a genuine three-dimensional multi-layer multi-color microparticle mark when viewing a magnified image of the actual microparticle mark, two-dimensional replica images create challenges for automated readers.

Therefore, it would be desirable to produce systems, methods, and apparatuses for automatically authenticating marks on or in articles, article packaging, or article labeling by verifying that the marks incorporate authentic, three-dimensional objects such as microparticles.

SUMMARY OF THE INVENTION

The present invention provides a system, method, and apparatus for authenticating microparticle marks. The authentication utilizes two or more sets of information captured or acquired for the mark in response to illumination of the mark by electromagnetic energy, such as in the visible frequency range. These multiple sets of information are then used to verify that the mark includes three-dimensional objects such as microparticles. The two or more sets of information about the mark may be obtained by variations in illumination frequencies or by variations in illumination/sample/detector geometries or any combinations thereof and can be captured or acquired as part of one, two, or more images of the microparticle mark.

Two or more sets of information about the mark may be acquired or captured by, for example: (1) using two or more differently-colored light sources, (2) using two or more directionally-oriented light sources, (3) using two or more directionally-oriented detectors, (4) effecting movement of a specimen, light source, detector, or combinations thereof, (5) acquiring or capturing a first set of data or source of information from an authentic mark and requesting a second set of data or source of information from a specimen in the field that can only be generated from an actual authentic mark, as well as combinations of different sets of these or similar methods.

In an embodiment, two or more light sources can be employed in which the color spectra of the light sources are different. In this embodiment, when a single image is acquired by a camera in a reader and sent to an image processor, the shadows cast by the microparticles can be separated from the rest of the image into two sets of information that are then checked to ensure that these sets of information represent authentic shadows created by three-dimensional objects such as microparticles. If an attempt is made to make a two-dimensional rendition of the microparticle field in the mark, the color spectra that is cast onto the counterfeit two-dimensional print would "add" to the entire print, enabling an image processor/analyzer to interpret the image as a two-dimensional print. Only three-dimensional objects will cast shadows that will separate the colors from the two different illuminating lights.

In another embodiment, two or more images can be captured by using illumination from light sources in different spatial arrangements. In each of these images, shadows will be cast in different directions based upon the spatial arrangement of the light sources. Analysis of each of these images and observation of the expected shifting in shadows between them can be used to verify the presence of three-dimensional objects such as microparticles.

In a further embodiment, effecting movement of a specimen in relation to a single light source can be used to acquire or capture two or more images, information bands, or other sets of data. In each of these, shadows are cast in different directions based upon the spatial arrangement of the specimen relative to the light source. Analysis of each of these images and observation of the expected shifting in shadows between them can be used to verify the presence of three-dimensional objects such as microparticles. Examples of movement of a specimen may include rotation of the specimen, movement along a directional axis, such as the swiping of a credit card, or any variation of the orientation of the specimen in up to six degrees of freedom during acquisition of a plurality of images of the mark.

In a further embodiment, two or more detectors can be employed to capture images from different directions relative to the mark. This embodiment provides an example where the amount of each color observed in a microparticle or the shape of the microparticle or other features may be seen to vary with viewing angle, due to the viewing of different portions of the microparticle. Again, variations in images captured by affecting movement of a specimen in relation to a single detector can also be utilized to look for variations in color, shape, or other features observed on a plurality of the sides of the microparticle as evidence of the authentic, three-dimensional nature of the mark.

In an additional embodiment, an image, information band, or other set of data can be captured from an authentic mark at the time that the mark is created and stored in a database, such that the existence and placement of shadows and/or changes in colors observed on a plurality of the sides of the microparticle marks can be predicted on an image, information band, or other set of data taken from a mark in the field.

In one embodiment, a three-dimensional positional map of each microparticle that comprises the authentic mark is generated by multi-dimensional positional analysis that can be used for subsequent creation of the expected response of images of the authentic mark acquired in response to any number of variations in illumination and/or movement of the mark and/or detectors. Analysis of each of these for the expected existence and placement of shadows and/or changes in colors observed on a plurality of the sides of the microparticle marks, for example, can be used to verify the presence of actual three-dimensional objects such as microparticles as part of the mark.

In an additional embodiment, a single image may be used to detect the presence of shadows based on a single directional light source and cast by three-dimensional microparticles in the substrate or carrier medium. In this embodiment, the shadow cast by a three-dimensional microparticle in the mark will be in the opposite direction of the incident light source. While this embodiment may risk the false authentication of a counterfeit mark presenting a 2D image with a shadow pre-rendered in the image, this will only be the case when the counterfeit mark is presented in a very specific orientation that directs the rendered shadow in the expected direction. The previous embodiments address this shortcoming.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

A system, apparatus, and method for authenticating microparticle marks or marks including other three-dimensional objects can be performed by acquiring or capturing two or more images, information bands, or other sets of data to verify that a microparticle mark includes three-dimensional microparticles. In one embodiment, the two or more sets of information in the forms of images, information bands, or other sets of data are captured or acquired for the mark in response to illumination of the mark by electromagnetic energy (i.e., light), such as in the visible frequency range. Although other frequency ranges of electromagnetic radiation may be utilized in accordance with the present invention, the visible frequency range lends itself well to the case where multilayered multicolored microparticles are used.

Alternatively, other electromagnetic frequencies that would generate other "background" responses may be desirable to be used in situations where the background on which the microparticle mark is to be applied includes a multiplicity of colors/patterns or backgrounds that include colors/reflections similar to the color/reflection of the illumination or microparticles.

Exemplary embodiments of acquiring or capturing the two or more images, information bands, or other sets of data are described. The exemplary embodiments include, for example: (1) using two or more differently-colored light sources, (2) using two or more directionally-oriented light sources, (3) using two or more directionally-oriented detectors, (4) effecting movement of a specimen, light source, detector, or combinations thereof, (5) acquiring or capturing a first set of data or source of information from an authentic mark and a requesting a second set of data or source of information from a specimen in the field that can only be generated from an actual authentic mark, as well as combinations of different sets of these or similar methods.

The system, method, and apparatus described herein can be used in addition to identification and authentication measures depicted and described in the patent applications attached hereto as Appendixes A and B, both incorporated herein by reference in their entirety. The patent application entitled "EXPRESSION CODES FOR MICROPARTICLE MARKS BASED ON SIGNATURE STRINGS," attached hereto as Appendix A, describes a system and method for identifying and authenticating articles using unique codes obtained from marks incorporating a multiplicity of microparticles on or in articles, article packaging, or article labeling where the unique expression codes are based on signature strings for individual microparticles. The patent application entitled "AUTOMATIC MICROPARTICLE MARK READER," attached hereto as Appendix B, describes an automatic microparticle reader and method for identifying and authenticating articles using microparticle codes and unique expression codes obtained from microparticle marks.

Microparticle Mark Structure

As described herein, the various embodiments of the present invention relate to systems, methods, and apparatuses for authenticating marks on or in articles, article packaging, or article labeling, whereby the marks are verified to have one or more authentic, three-dimensional objects such as microparticles. For purposes of the present invention, "microparticles" are any relatively small particles comprising sizes, shapes, and other features described below. "Microparticles" as used herein is not limited to multi-layered multi-colored particles unless expressly indicated.

Figure 1:
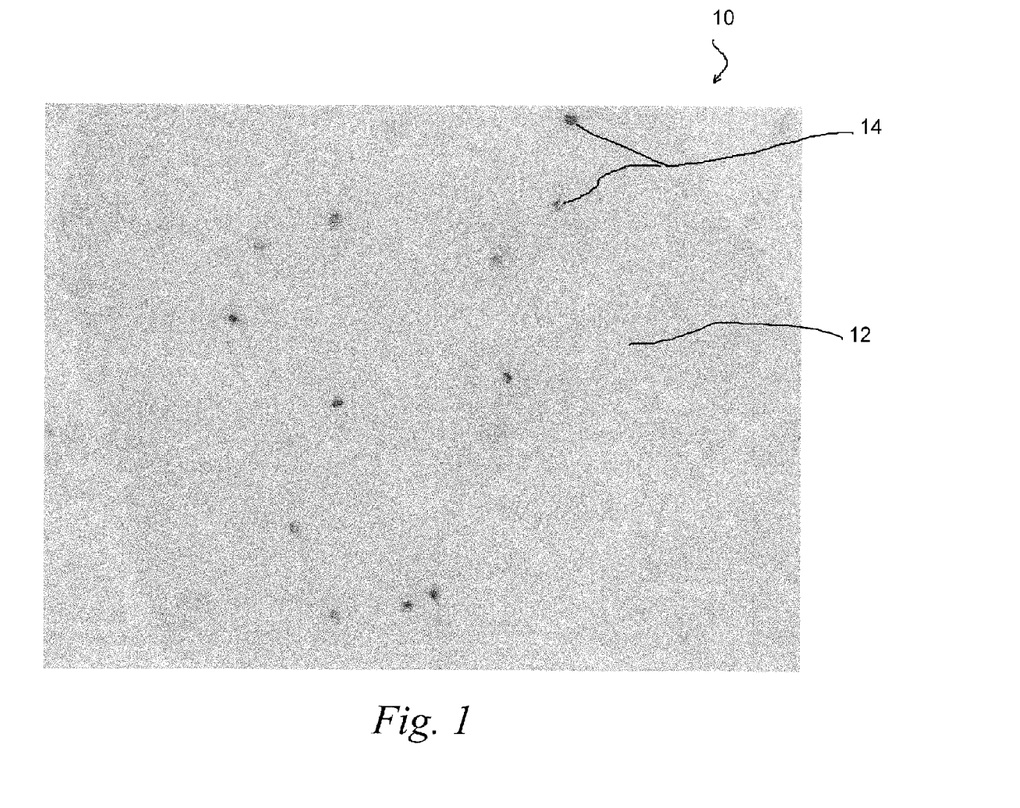
FIG. 1 shows a microparticle mark according to a first embodiment of the present invention.
Figure 2:
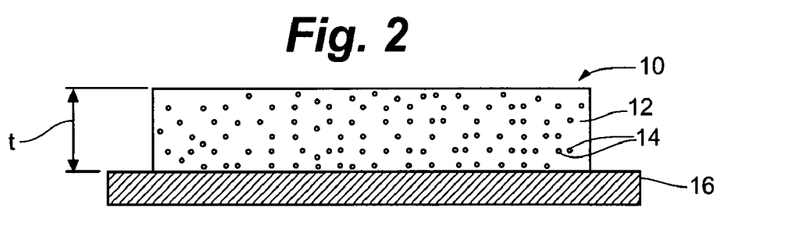
FIG. 2 is a cross-sectional view of the microparticle mark of FIG. 1.

Referring to FIGS. 1 and 2, an authentic microparticle mark 10 according to a first embodiment generally comprises a carrier material 12 and microparticles 14 dispersed in the carrier material and presented on a substrate 16. In one embodiment, the microparticles 14 can be dispersed generally uniformly, yet randomly located and oriented, throughout the carrier material 12. Alternatively, in other embodiments at least some of the microparticles 14 may be intentionally located at predetermined locations and/or patterns within the carrier material 12. Such intentionally positioned microparticles 14 can form a registration and/or identification pattern to be used in conjunction with the scanning of other randomly oriented microparticles 14 as part of the microparticle mark 10 or can comprise the microparticles 14 of the microparticle mark 10. In still other embodiments, at least some of the microparticles 14 may be pseudo randomly positioned in the carrier material 12, such as preferentially doping some areas/volumes with higher concentration of microparticles 14 than other areas/volumes.

The microparticle mark 10 according to this first embodiment generally comprises a single carrier layer 12 presented on a substrate 16, the microparticles 14 being substantially dispersed therein. In the various embodiments described herein, the substrate can comprise the article to be authenticated directly, its packaging, its labeling, etc. Alternatively, the substrate may include other security devices, such as a hologram, RFID tag, a bar code, or any other identification or reference indicia adapted to be affixed to an article.

Figure 3:
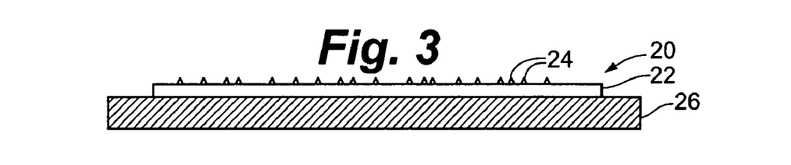
FIG. 3 is a cross-sectional view of a microparticle mark according to a second embodiment depicting the structure of the microparticle mark.

Referring to FIG. 3, an authentic microparticle mark 20 according to a second embodiment generally comprises microparticles 24 dispersed on an adhesive or coating material 22 and generally presented on a substrate 26. The microparticles 24 in this second embodiment can be dispersed generally uniformly, yet randomly located and oriented, on the carrier material 22. Alternatively, at least some of the microparticles 24 may be intentionally located at specific positions on the carrier material 22 or the microparticles 24 may be located in a pseudorandom manner.

Figure 4:
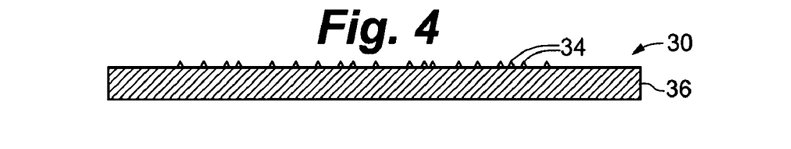
FIG. 4 is a cross-sectional view of a microparticle mark according to a third embodiment depicting the structure of the microparticle mark.

Referring to FIG. 4, an authentic microparticle mark 30 according to a third embodiment generally comprises microparticles 34 dispersed directly on a substrate 36. The microparticles 34 can be projected towards the substrate 36 with a low, medium, or high velocity, such that the microparticles 34 are at least partially embedded into or onto the substrate material. The velocity of the projection can depend upon the relative hardness of the substrate. The microparticles 34 in this third embodiment can be dispersed generally uniformly but randomly oriented on the substrate 36. Alternatively, at least some of the microparticles 34 may be intentionally located at specific positions on the substrate 36 or the microparticles 34 may be located in a pseudorandom manner.

Figure 5:
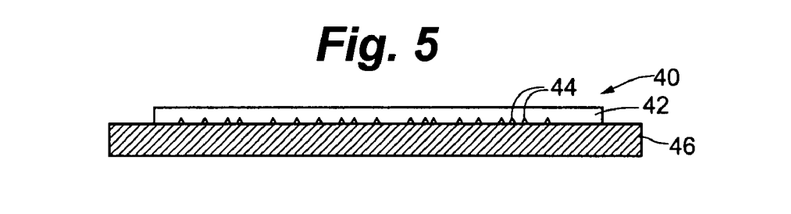
FIG. 5 is a cross-sectional view of a microparticle mark according to a fourth embodiment depicting the structure of the microparticle mark.

Referring to FIG. 5, an authentic microparticle mark 40 according to a fourth embodiment is similar to that of the microparticle mark 30 according to the third embodiment, except that the microparticles 44 can be partially or fully covered with coating material 42 to retain the microparticles 44 dispersed on the substrate 46. Such a carrier material can include an adhesive, varnish or similar securing arrangement. In another embodiment, the coating material 42 may be one or more layers of film or laminate that generally secure the microparticles 44 in position relative to each other and in some embodiments the adhesive may be on the laminate of the coating material 42, on the substrate 46 or both. The microparticles 44 in this fourth embodiment can be dispersed generally uniformly but randomly oriented in or on the carrier material 42. Alternatively, at least some of the microparticles 44 may be intentionally located at specific positions on the carrier material 42 or the microparticles 44 may be located in a pseudorandom manner.

Figure 6A:
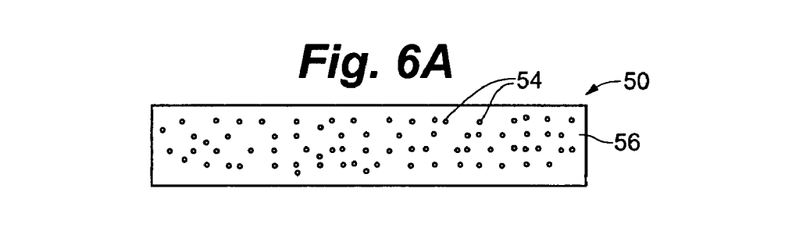
FIGS. 6A and 6B are cross-sectional views of a microparticle mark according to fifth and sixth embodiments depicting the structure of the microparticle mark.
Figure 6B:
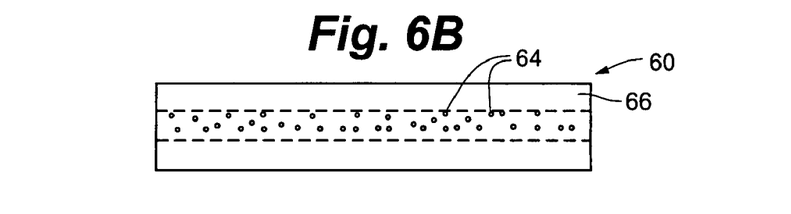

Referring to FIGS. 6A and 6B, an authentic microparticle mark 50, 60 according to fifth and sixth embodiments generally comprises microparticles 54, 64, respectively, dispersed in a substrate 56, 66, respectively. The microparticles in the fifth and sixth embodiments can be dispersed generally uniformly and randomly throughout the thickness of the substrate 56 as depicted in FIG. 6A or within a layer of the substrate 66 as depicted in FIG. 6B. It will be understood that the layer containing the microparticles may be sandwiched between other layers of the substrate without microparticles, or the layer may be adjacent a surface of the substrate, or there may be multiple layers. Alternatively, at least some of the microparticles of microparticle marks 50, 60 may be intentionally located at specific positions on the substrates 56, 66 or may be located in a pseudorandom manner.

While not limited to such, the microparticles used for the microparticle marks according to the various embodiments of the present invention can comprise multi-layered color-coded microparticles. Examples of such multi-layered color-coded microparticles capable of expressing a first-level microparticle code are described in U.S. Pat. Nos. 4,053,433, 4,390, 452, 4,606,927, 6,309,690, 6,455,157, 6,647,649, 6,620,360, Great Britain Patent No. GB 1,568,699 and German Patent No. DE 19614174, all of which are incorporated herein by reference in their entirety. It will be understood that for purposes of an embodiment of the present invention, existing microparticles are considered capable of generating a microparticle code if the microparticle mark method and system in which these microparticles are being utilized enables observation, viewing, or reading of each microparticle in such a way as to express more than a binary state of that single microparticle. For example, a multi-layer, multi-color microparticle coding system employing 4 microparticles per code, each having 3 layers, and formulated with 12 color possibilities would be capable of expressing up to 9,834,496 unique combinations of color arrangements, each of which would represent a different microparticle code from within that individual microparticle coding system.

Alternatively, the powder microparticles as described, for example, in PCT Publ. No. WO2005/104008A1 could be utilized in accordance with the teachings of the present invention. Such single expression microparticles that express only a binary state for a given microparticle (i.e., is the microparticle present or not) and the existing automatic readers can only be effectively considered to present a zero-level (binary) code for an individual microparticle. In a similar manner, existing magnetic and electronic security systems can also be considered as having individual particles, typically ferromagnetic particles, that are single expression/binary microparticles. While existing automatic readers for such single expression microparticles can generate longer and more complex codes by using positional information associated with a multiplicity of such single expression microparticles, these readers would need to be equipped with additional features and/or capabilities in order to be able to generate and/or utilize the two or more data sets related to three-dimensional aspects of the microparticles in accordance with the teachings of some of the embodiments of the present invention.

The microparticles can comprise additional characteristics that are further usable in verifying that the mark includes three-dimensional objects, such as microparticles, therein. Such additional characteristics include, for example, text or other indicia on one or more of the microparticle surfaces, reflectivity, shapes, refractive index, surface geometry or finish, dynamic crystal lattice properties (such as magneto-electrooptic properties, mechanical-electrooptic properties or thermal-electrooptic properties associated with lattice structures such as LCD or piezoelectric materials), and various optical properties including polarization. For example, the index of refraction of the microparticles and carrier material can be selected to optimize the ability to distinguish and sharpen the visual distinction between the microparticles from the carrier material when using a reader to verify the presence of three-dimensional microparticles in a mark.

In embodiments comprising multi-layered color-coded microparticles or in other embodiments, the microparticles used for the microparticle marks can comprise one or more reflective layers and/or one or more non-reflective surfaces. For example, the multi-layered color-coded microparticles can include a reflective layer at one end thereof and a non-reflective layer at the other end thereof, with one or more intermediate multi-colored layers there between. In other embodiments, the microparticles can include a reflective layer at one end thereof and a non-reflective layer at the other end thereof, with no multi-colored layers there between.

In other embodiments, combinations of more than one kind of microparticles as previously described may be utilized as part of the microparticle mark. For example, multi-colored microparticles may be combined with reflective microparticles, where the reflective microparticles are utilized to verify the authenticity of the microparticle mark and the multi-colored microparticles are used to identify the particular microparticle mark.

For the reasons discussed below, the reflective and non-reflective layers can further aid in authenticating a mark by verifying that the mark includes three-dimensional objects, such as microparticles, therein. In the embodiments in which the microparticles comprise reflective surfaces, the reflective properties of the microparticles can be such that any reflection off of the reflective surfaces is not detectable by a naked eye, but is detectable under magnification to retain the covertness of the microparticle mark. In other embodiments, the reflective properties of the microparticles can be detectable by a naked eye or under any type of low magnification. This can be used in marks in which it is desirable to warn any potential counterfeiters that the product, packaging, or labeling contains a microparticle mark as depicted and described herein. In these embodiments, the microparticles comprising reflective surfaces can be arranged to form words, marks, or other indicia that can be detectable by a naked eye or under any type of low magnification.

In further embodiments, the microparticles used for the microparticle marks can comprise one or more generally clear or lucid (transparent or translucent) layers therein. The clear or lucid layers can further aid in authenticating a mark by verifying that the mark includes three-dimensional objects, such as microparticles, therein.

In other embodiments, the microparticles used for the microparticle marks can comprise one or more generally dynamic crystal lattice layers or components. The dynamic crystal lattice layers or components can further aid in hiding, identifying and/or authenticating a mark that includes three-dimensional objects, such as microparticles, therein.

For many applications, microparticles are about 0.1 micron to about 500 microns at their average cross section dimension, preferably about 0.1 micron to about 100 microns, and optimally in ranges of about 1 micron to about 10 microns, about 10 microns to about 20 microns, about 20 microns to about 40 microns, and about 40 microns to about 100 micrometers. The size of the microparticles can depend upon the applications, for example, in printing applications it can be desirable to have microparticles of less than about 10 microns. A person of ordinary skill in the art will recognize that additional ranges within the explicit ranges given above are contemplated and are within the present disclosure.

The microparticles can have various aspect ratios. In an embodiment, the microparticles have an aspect ratio of approximately 1:1. By having such an aspect ratio, the microparticles may be more easily applied and randomly oriented within or on a carrier, adhesive, or coating or on a substrate. In other embodiments, the microparticles have an aspect ratio of approximately 1:2. In further embodiments, the microparticles have an aspect ratio of approximately 1:4, 1:8, or 1:16. A person of ordinary skill in the art will recognize that additional aspect ratios within the explicit aspect ratios given above are contemplated and are within the present disclosure.

The concentration of microparticles used to identify an object can also vary. For example, the microparticles might be incorporated directly into the article, its packaging, or its labeling at a concentration of 0.0001 to 10 parts by weight for every 100 parts by weight material, and in another embodiment at a concentration of 0.001 to 3 parts by weight for every 100 part by weight material. Alternatively, the microparticles can be combined with an adhesive or carrier at a concentration of 0.0001 to 10 parts by weight for every 100 parts by weight material, and in another embodiment at a concentration of 0.001 to 3 parts by weight for every 100 part by weight material. A person of ordinary skill in the art will recognize that additional ranges within the explicit ranges given above are contemplated and are within the present disclosure.

In terms of quantifying the number of microparticles within a mark, a mark can have at least one microparticle and up to any number of microparticles. This number can be determined based upon the requirements for unique microparticle codes and expression codes for a specific application. In an embodiment, a mark comprises 1-10 microparticles. In another embodiment, a mark comprises 11-40 microparticles. In another example embodiment, a mark comprises 41 or more microparticles, where each multiplicity of microparticles provides a microparticle code and the positions, features, and/or relationships of the individual microparticles are utilized to generate one or more signatures strings, which can be used to generate one or more second-level expression codes for the microparticle mark. In one embodiment, the signature strings and microparticle codes can be used to generate a unique expression code for that microparticle mark.

In one embodiment, the adhesive, carrier, or substrate material can be transparent or translucent to the frequency of light used to illuminate the microparticles, such that the microparticles are readily discernable. The adhesive or carrier can include solvent materials, including both organic solvent based adhesives such as lacquers, as well as water based adhesives such as latexes, hot melt adhesives, curing systems including epoxies, polyurethanes, enamels, such as, for example, acrylic and alkyds, or a UV curing material. UV curing materials can enable application of the carrier material with microparticles in high volume applications, due to the quick curing ability.

Figure 7:
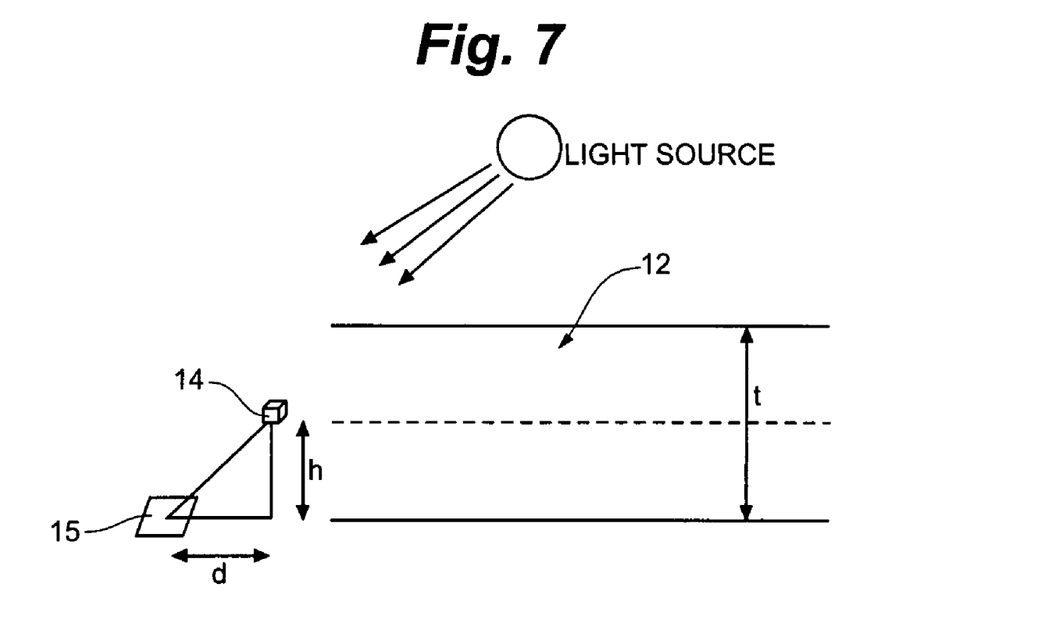
FIG. 7 is a cross-sectional view of the carrier of a microparticle mark depicting the calculation of the thickness of the carrier.

Referring to FIG. 7, the thickness of the carrier 12 may be chosen to optimize the ability to observe the one or more microparticles 14 in the carrier 12 and also to verify the presence of one or more three-dimensional microparticles 14 through shadow 15 and the other techniques disclosed. It will be understood that the assumption underlying this optimization is that on average, the microparticles will be uniformly suspended in the carrier with an average height "h" of one-half the thickness "t," in which case the average shadow will be cast in the case of an illumination at 45 degrees relative to the surface of the mark at a distance "d," which will be one-half the thickness of "t". It will be understand that the geometries and dimension for this depth of field analysis may be chosen based on a length of an expected shadow that defines resolution needs in relation to a thickness and index of refraction of a given carrier and a given particle size or size range in order to provide detectable shadow images for a particular illumination and detector arrangement. In one embodiment, the depth of field resolution is about 200 microns.

Examples of Acquiring Two or More Images, Information Bands, or Sets of Data

Figure 8:
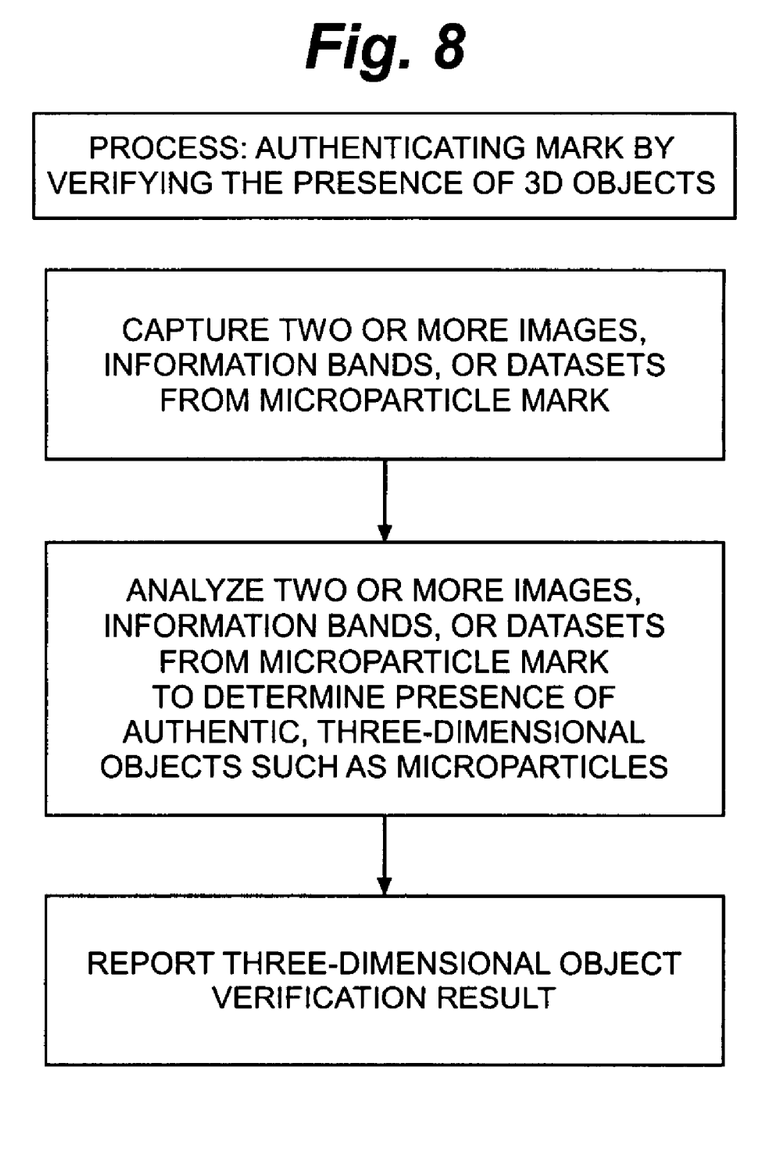
FIG. 8 is a block diagram of the mark authentication method according to an embodiment of the present invention.

The general method or process of authenticating a mark by verifying the presence of three-dimensional objects such as microparticles is depicted in the flowchart included in FIG. 8.

As depicted in FIG. 8, in one embodiment of the present invention, the mark authentication process generally includes: (1) using one or more apparatuses to capture, acquire, or obtain two or more images, information bands, or datasets from a mark presented for authentication, (2) analyzing the two or more images, information bands, or datasets to determine if the mark contains authentic three-dimensional objects such as microparticles, and (3) reporting the results of the analysis, including whether the mark contains authentic three-dimensional objects such as microparticles.

In the following sections are various embodiments of capturing, acquiring, or obtaining two or more information bands or sets of data that can be used to verify that the mark includes three-dimensional objects such as microparticles. As described in greater detail below, exemplary embodiments include, for example: (1) using two or more differently-colored light sources to acquire one or more images of the microparticle mark, (2) using two or more directionally-oriented light sources to acquire one or more images of the microparticle mark, (3) using two or more directionally-oriented detectors, (4) effecting movement of a specimen, light source, or detector or combination thereof, (5) acquiring or capturing a first set of data or source of information from an authentic mark and a requesting a second set of data or source of information from a specimen in the field that can only be generated from an actual authentic mark, as well as combinations of different sets of these or similar methods.

Example 1

Multiple Differently-Colored Light Sources

In a first example, different colored lighting can be used to generate shadows in a three-dimensional mark environment that generally would not occur in two-dimensional images. The shadows can occur because the microparticles in a three-dimensional mark are generally suspended above the substrate of the article and/or at different spatial orientations within a carrier or substrate.

Figure 9:
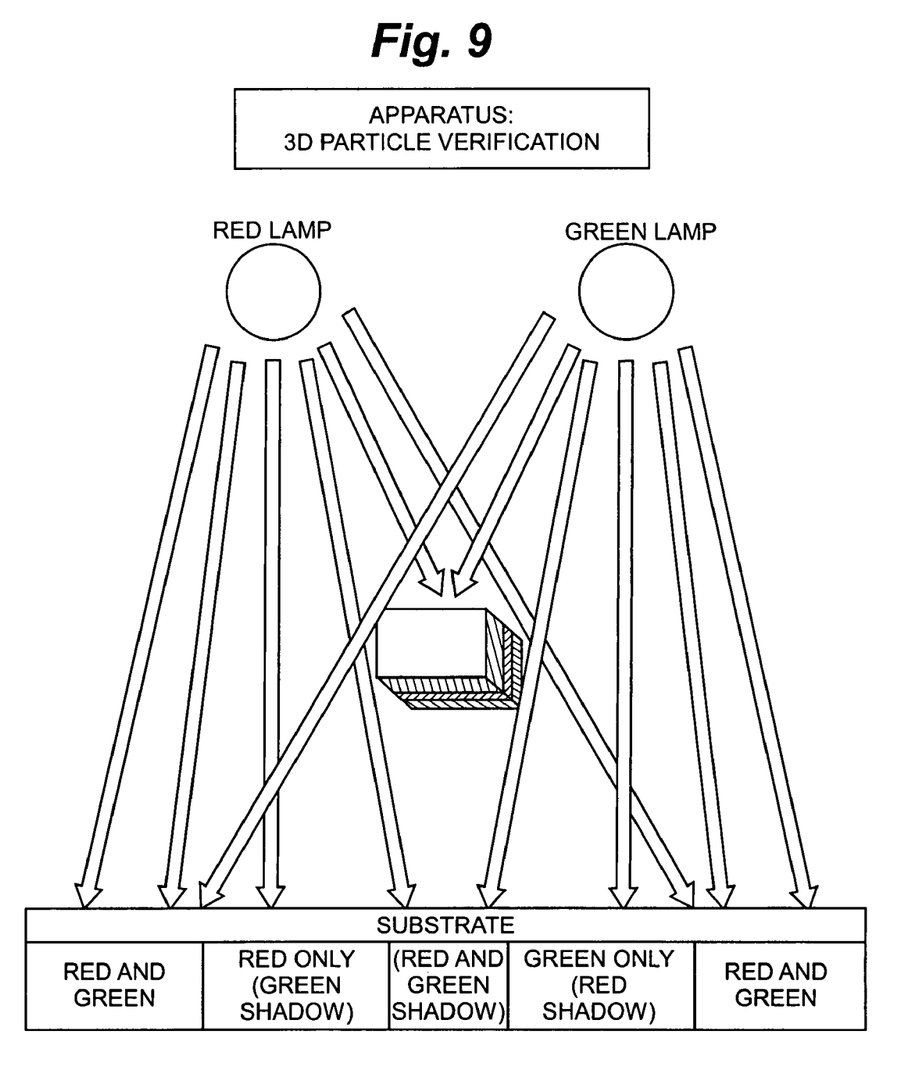
FIG. 9 is a schematic diagram of a portion of a reader apparatus that can be used to verify that a mark includes authentic, three-dimensional objects such as microparticles.

Specifically, referring to FIG. 9, two or more light sources can be employed in which the color spectra of the light sources are different. Directional components of the two or more spectra may be different, as shown in FIG. 9, or their directional components may be the same. In these embodiments, when an image is acquired by a camera and sent to an image processor, the shadows within the image can be identified and this shadow information can be used to verify the presence of authentic three-dimensional objects such as microparticles. If an attempt was made to make a two-dimensional rendition of the microparticle field in a mark, the color spectra cast onto the forged two-dimensional print would "add" to the entire image, allowing the image processor/analyzer to interpret the image as a two-dimensional microprint. Only three-dimensional objects will generally cast shadows that will separate the colors from the two different illuminating lights.

It will be noted that in the embodiment depicted in FIG. 9, the detector may be positioned in a position to acquire or capture transmissive light. This embodiment could be implemented, for example, in a situation where the microparticle mark is disposed in a transparent portion of a substrate. Alternatively, the detector may be positioned to capture/acquire reflected light, such as, for example, by positioning the detector between the two light sources in FIG. 9. It will be seen that the ability to perform three-dimensional verification in accordance with this embodiment of the present invention relies on the changing attributes of the shadows, either transmissive or reflected, cast by the three-dimensional nature of the microparticles and the corresponding use of two or more sets of data related to the three-dimensional expressions of the microparticles which, in this case are the different shadow images that would be present in the two or more data sets. For purposes of some embodiments of the present invention, it will be understood that the two or more sets of data can be acquired and/or processed based on a single image capture. For example, use of post capture color filtering to generate two or more different sets of "filtered" image data for different color spectra will generate the two or more different sets of data utilized by this embodiment of the present invention.

Example 2

Multiple Directionally-Oriented Light Sources

Figure 10A:
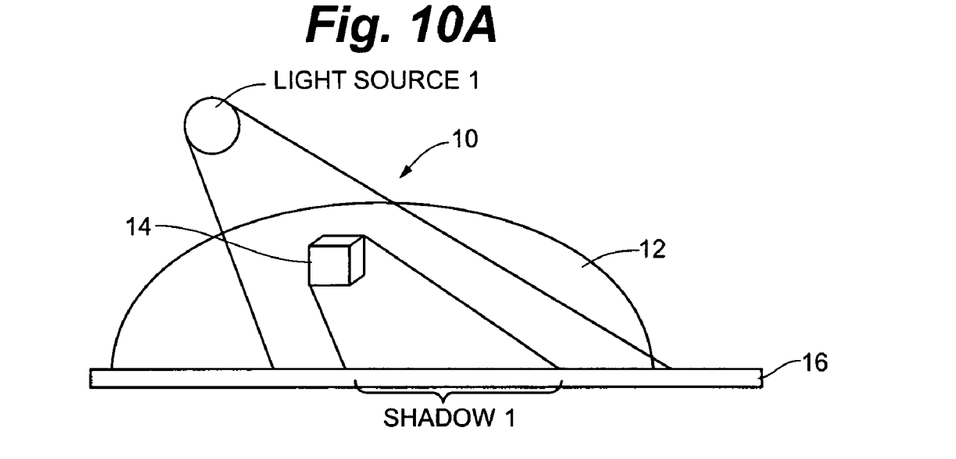
FIGS. 10A and B show examples of variation of light-source geometries relative to a three-dimensional mark.
Figure 10B:
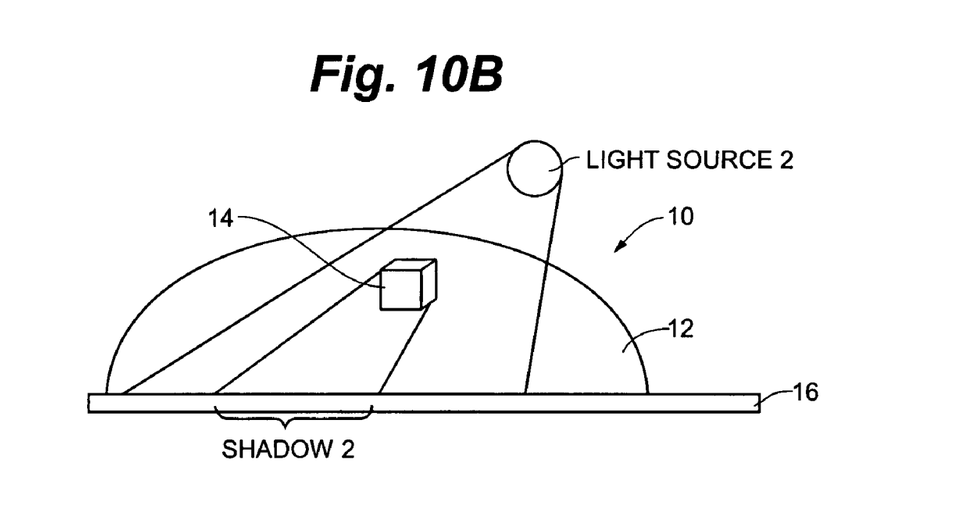

In a second example, referring to FIGS. 10A and 10B, the directionality of the lighting can be used to generate/detect shadows in three-dimensional environments that generally would not occur in two-dimensional images. The shadows can occur because the microparticles 14 in a three-dimensional mark 10 are generally suspended above the substrate 16 of the article and/or at different spatial orientations within a carrier 12 or substrate 16.

Specifically, one or more images can be captured by using illumination from light sources (a first light source—light source 1 and a second light source—light source 2) in different spatial arrangements, such as those depicted in FIGS. 10A and 10B. In each of these images, shadows (shadow 1 and shadow 2) are cast in different directions based upon the spatial arrangement of the light sources (light source 1 and light source 2). By using the analysis of each of the images and an observation of the expected shifting in shadows between the images, one can verify the presence of three-dimensional objects such as microparticles.

Example 3

Multiple Directionally-Oriented Detectors

Figure 11A:
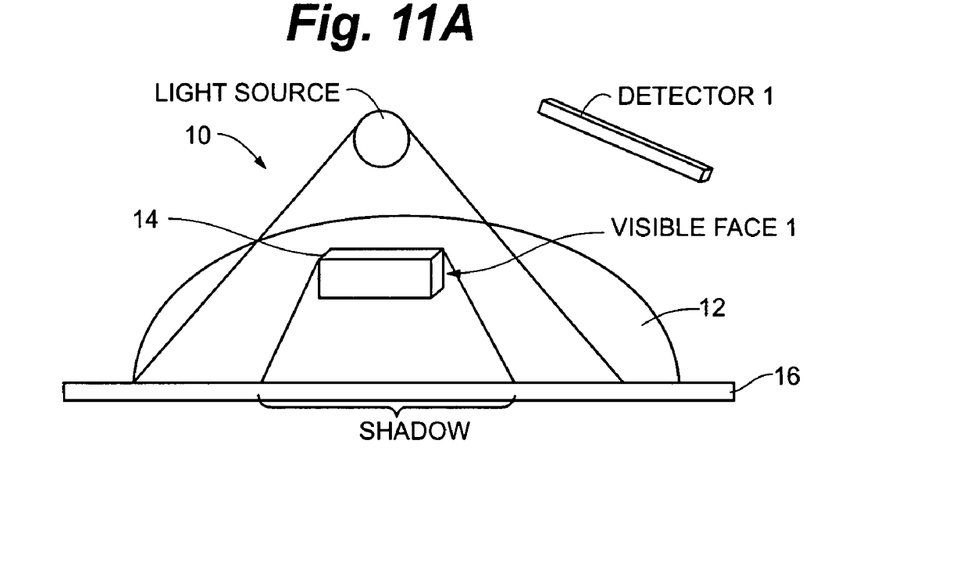
FIGS. 11A and 11B show examples of variation of detector geometries relative to a three-dimensional mark.
Figure 11B:
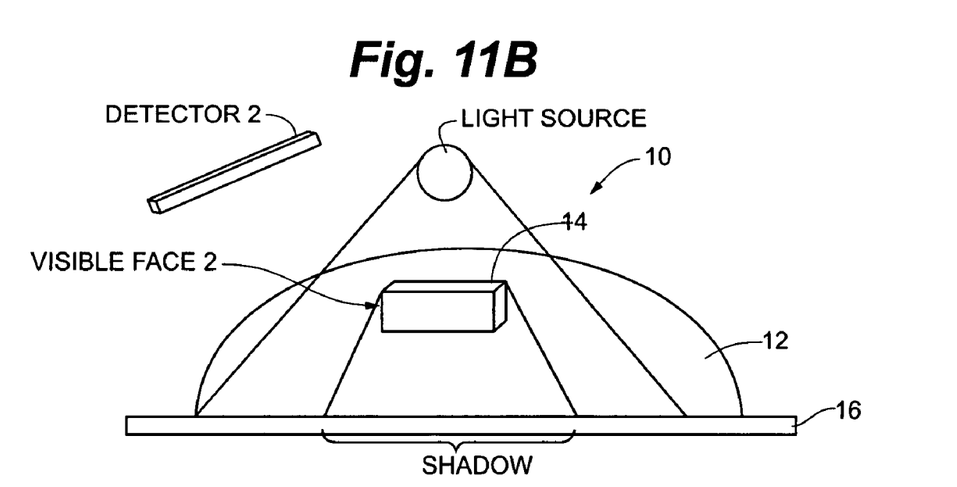

Referring to FIGS. 11A and 11B, the use of detectors at more than one position relative to a mark 10 can be used to acquire or capture two or more image sets, datasets, or sources of information. In each of FIGS. 11A and 11B, the visible faces (Visible Faces 1 and 2) of microparticle 14 differs based on the position of the detectors (Detectors 1 and 2). Analysis of the visible face presented to detectors at different positions can be used to verify the presence of three-dimensional objects such as microparticles. For such analysis, a single detector may be used to acquire or capture a sequence of two or more image sets, datasets, or sources of information by positioning the detector at a plurality of positions. Alternatively, more than one detector may be positioned at a plurality of positions, thereby producing more than one image set, dataset, or sources of information. A combination of fixed and movable detectors may also be used.

As a further example, in an authentic three-dimensional mark, an image or information capture at a first direction (e.g., taken at a 45° angle) will yield a different image or information than an image or information capture at a second direction (e.g., taken at a 90° angle). Variations in image capture angle can be created by variations in orientation and position of the mark, detectors, or both. This is because microparticles closer to the surface may block out different microparticles farther below the surface depending upon the directionality of the image or information capture.

It will be understood that two-dimensional attempts to replicate the three-dimensional microparticle marks of the present invention will present a constant of microparticles detected, whereas in the three-dimensional mark different sets of information may hide or reveal different numbers of microparticles as a result of shadowing and/or overlap due to the depth of field of the three-dimensional microparticle.

In the embodiment utilizing multi-layer multi-color microparticles, different angles of image capture will also result in different color images on a plurality of sides of the three-dimensional microparticle. On the other hand, taking an image or information capture of a two-dimensional image replication at different angles will not have such an effect. Rather, the same image or information will generally be produced regardless directionality of the image or information capture. As noted in connection with Example 4 for example, variations of this embodiment utilizes the differences in images that may be created be causing one or both of the mark and/or detectors to be in motion relative to the other during the acquisition of the two or more sets of data.

Example 4

Effecting Movement of a Specimen

Figure 12A:
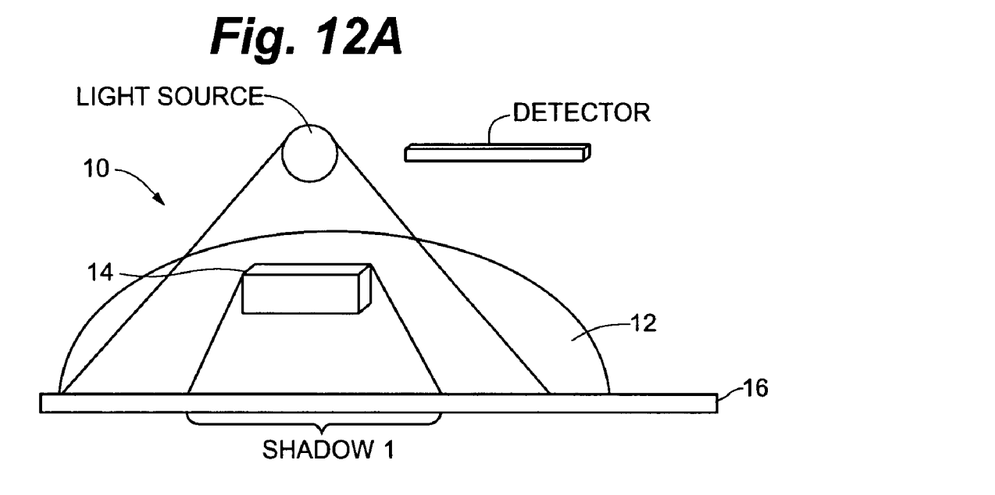
FIGS. 12A and 12B show examples of variation of position of three-dimensional mark relative to light sources and detectors.
Figure 12B:
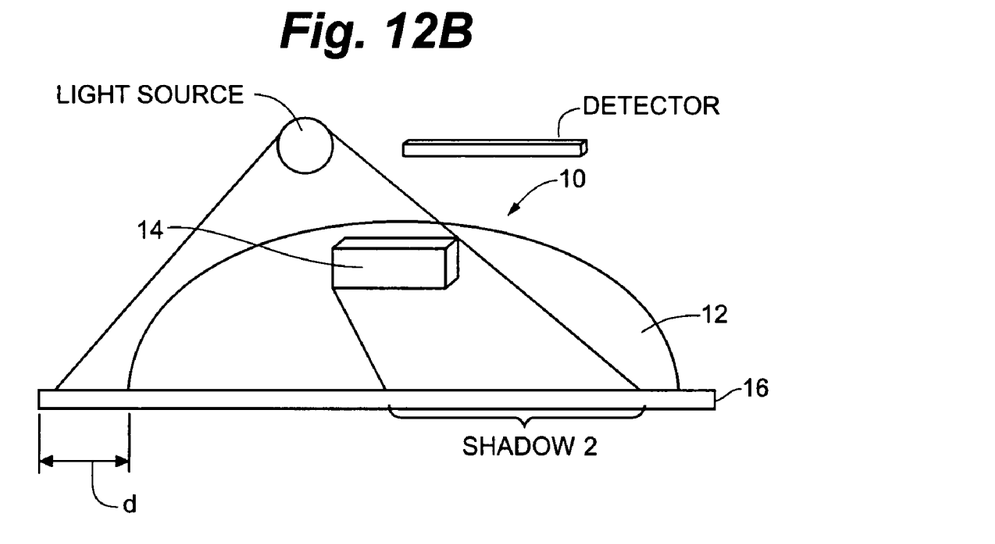

Referring to FIGS. 12A and 12B, effecting movement of a specimen with mark 10 can similarly be used to acquire or capture two or more images, sets of data, or other sources of information. In each of these images, shadows (shadow 1 and shadow 2) cast on carrier 16 as a result of the microparticle 14 in the carrier 12 of the mark 10 will be different in size and/or direction based upon the spatial arrangement of the specimen and mark 10 relative to the light source and detector by a distance "d," corresponding to the location of the mark 10 at image 1 and the location of the mark 10 at image 2. Analysis of each of these images and observation of the expected shifting in shadows between them can be used to verify the presence of three-dimensional objects such as microparticles.

It will be noted that the spatial movement of the specimen and mark can be accomplished by movement in any one or more of one, two, or three dimensions or contributions in up to six degrees of freedom.

The embodiments in Examples 1, 2, 3, and 4 utilize at least two sets of information captured/acquired from the microparticle mark to verify the authenticity of the mark in the field as a genuine three-dimensional mark. The next embodiment in Example 5 can be used either alone or in combination with any of the prior examples and utilizes three-dimensional data collected preferably at the time the mark is created to provide a further level of confirmation of a specific set of shadows that are expected for the microparticle mark.

Example 5

Comparison of Specimen with Expected Result

Usable information can be captured from an original mark using the various lighting environments described above to create shadows. Such information can be used to authenticate a mark in the field by verifying that a mark includes three-dimensional microparticles. In this embodiment, the two sets of information are effectively displaced in time.

To obtain such information, an algorithm can be used to generate a relatively small alphanumeric string based upon an image of an authentic mark comprising three-dimensional microparticles, the alphanumeric string usable to predict the shadow that can be expected to result when a mark in the field is tested. If the mark in the field is tested and does not contain predicted presence of or positioning of an expected shadow, it can then be determined that the mark is not authentic.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A method for determining an authenticity of a microparticle mark having a plurality of microparticles and using a determination of authenticity for the microparticle mark in authenticating an article containing the microparticle mark, comprising:
   acquiring at least a first set and a second set of information from the microparticle mark, the second set of information differing from the first set of information and the first set and the second set of information each based at least in part on the plurality of microparticles;
   using a processing system to perform an automatic analysis of at least the first set and the second set of information to determine the authenticity of the microparticle mark for the article based on confirmation that the microparticle mark includes at least one difference between the first set and the second set of information due to characteristics that are producible only by three-dimensional microparticles; and
   providing a tangible indication of an authentication of the article in response to the automatic analysis of the existence and authenticity of the microparticle mark, wherein the automatic analysis is performed by an automated reader and comprises:
   generating a code based on analysis of the microparticles in the microparticle mark;
   determining if the code is valid;
   if the code is valid, confirming the authenticity of the microparticle mark by comparing the first set and the second set of information to determine the at least one difference between the first set and the second set of information is due to at least one of an existence and placement of shadows from at least one three-dimensional microparticle or changes in features attributable to differences in orientation of at least a plurality of sides of at least one three-dimensional microparticle as the authentication that the microparticle mark contains at least one three-dimensional microparticle.

2. The method of claim 1 wherein the step of determining if the code is valid is performed by comparing the code to an authorized database of codes representing authentic articles.

3. The method of claim 1 wherein the step of determining if the code is valid is performed by processing the code using an algorithm that determines if the code is valid.

4. The method of claim 1 wherein the step of acquiring the at least first set and the second set of information comprises obtaining information about the microparticle mark by generating variations in images captured of the microparticle mark selected from the set including: variations of frequencies of an illumination system of the microparticle mark, variations in geometries of at least one of the illumination system, the article and a detector system, variations in a time of capture of the images by the detector system, variations in a number of images captured by the detector system, and any combination thereof.

5. The method of claim 1 wherein the step of acquiring the at least first set and the second set of information comprises at least one method selected from the set including: using two or more differently-colored light sources, using two or more directionally-oriented light sources, using two or more directionally-oriented detectors, effecting movement of the article, a light source, a detector or any combination thereof.

6. The method of claim 1 wherein:
   at least one of the sets of information is captured from the microparticle mark at a time the microparticle mark was created, the at least one set of information being capable of reproducing an existence and placement of shadows and changes in features observed on a plurality of the sides of a multiplicity of three-dimensional microparticles positioned in the microparticle mark.

7. The method of claim 6 wherein the automatic analysis further comprises:
   receiving a challenge based on an expected information pattern generated from the set of data captured from the microparticle mark at a time the microparticle mark was created, the challenge being variably changeable; and
   analyzing the at least first set and second set of information to determine whether the expected information pattern is discernable for the microparticle mark.

8. The method of claim 1 wherein the plurality of microparticles in the microparticle mark are multi-layer, multi-color microparticles.

9. The method of claim 1 wherein acquiring at least the first set and the second set of information is accomplished by providing an automated reader adapted to scan the microparticle mark and including a variable illumination system that is used to dynamically vary illumination of the microparticle mark while at least two different images of the microparticle mark are scanned.

10. The method of claim 1, wherein the first and second sets of information are acquired by a reading device that is separate from the processing system.

11. A method comprising:
provinding an article having a microparticle mark having a plurality of microparticles; and
providing instructions for determining the authenticity of the mark and using a determination of authenticity for the mark in authenticating the article, the instructions comprising:
acquiring at least a first set and second set of information from the microparticle mark, the second set of information differing from the first set of information and the first set and the second set of information each based at least in part on the plurality of microparticles;
using a processing system to perform an automatic analysis of at least the first set and the second set of information to determine the authenticity of the microparticle mark for the article based on confirmation that the microparticle mark includes at least one difference between the first set and the second set of information due to characteristics that are producible only by three-dimensional microparticles; and
providing a tangible indication of an authentication of the article in response to the automatic analysis of the existence and authenticity of the microparticle mark,
wherein the automatic analysis comprises:
generating a code based on analysis of the microparticles in the microparticle mark;
determining if the code is valid;
if the code is valid, confirming the authenticity of the microparticle mark by comparing the first set and the second set of information to determine the at least one difference between the first set and the second set of information is due to at least one of an existence and placement shadows from at least one three-dimensional microparticle or changes in features attributable to differences in orientation of at least a plurality of sides of at least one three-dimensional microparticle as the authentication that the microparticle mark contains at least one three-dimensional microparticle.

12. The method of claim 11, wherein the step of acquiring the at least first set and the second set of information comprises obtaining information about the microparticle mark by generating variations in images captured of the microparticle mark selected from the set including: variations of frequencies of an illumination system of the microparticle mark, variations in geometries of at least one of the illumination system, the article and a detector system, variations in a time of capture of the images by the detector system, variations in a number of images captured by the detector system, and any combination thereof.

13. The method of claim 11, wherein the step of acquiring the at least first set and the second set of information comprises at least one method selected from the set including: using two or more differently-colored light sources, using two or more directionally-oriented light sources, using two or more directionally-oriented detectors, effecting movement of the article, a light source, a detector or any combination thereof.

14. The method of claim 11, wherein the first and second sets of information are acquired by a reading device that is separate from the processing system.

15. A method, comprising:
providing a reading device configured to acquire information related to an article having a microparticle mark having a plurality of microparticles;
providing instructions for determining the authenticity of the microparticle mark and using a determination of authenticity of the mark in authenticating the article, the instructions comprising:
acquiring at least a first set and a second set of information from the microparticle mark with the reading device, the second set of information differing from the first set of information and the first set and the second set of information each based at least in part on the plurality of microparticles
using a processing system to perform an automatic analysis of at least the first set and the second set of information to determine the authenticity of the microparticle mark for the article based on confirmation that the microparticle mark includes at least one difference between the first set and the second set of information due to characteristics that are producible only by three-dimensional microparticles; and
providing a tangible indication of an authentication of the article in response to the automatic analysis of the existence and authenticity of the microparticle mark,
wherein the automatic analysis comprises:
generating a code based on analysis of the microparticles in the microparticle mark;
determining if the code is valid;
if the code is valid, confirming the authenticity of the microparticle mark by comparing the first set and the second set of information to determine the at least one difference between the first set and the second set of information is due to at least one of an existence and placement shadows from at least one three-dimensional microparticle or changes in features attributable to differences in orientation of at least a plurality of sides of at least one three-dimensional microparticle as the authentication that the microparticle mark contains at least one three-dimensional microparticle.

16. The method of claim 15, wherein the step of acquiring the at least first set and the second set of information comprises at least one method selected from the set including: using two or more differently-colored light sources, using two or more directionally-oriented light sources, using two or more directionally-oriented detectors, effecting movement of the article, a light source, a detector or any combination thereof.

17. The method of claim 15, wherein the reading device is separate from the processing system.

* * * * *